United States Patent
Shinozaki

(10) Patent No.: US 7,493,134 B2
(45) Date of Patent: Feb. 17, 2009

(54) TRANSMISSION POWER CONTROL APPARATUS AND RADIO BASE STATION

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 671 days.

(21) Appl. No.: 11/086,122

(22) Filed: Mar. 22, 2005

(65) Prior Publication Data
US 2005/0176457 A1 Aug. 11, 2005

Related U.S. Application Data

(63) Continuation of application No. PCT/JP03/03242, filed on Mar. 18, 2003.

(51) Int. Cl.
*H04B 7/00* (2006.01)
(52) U.S. Cl. .......................... 455/522; 455/69; 370/318
(58) Field of Classification Search ............... 455/69, 455/522; 370/318
See application file for complete search history.

(56) References Cited

U.S. PATENT DOCUMENTS

| | | | |
|---|---|---|---|
| 6,173,162 B1 | 1/2001 | Dahlman et al. | |
| 6,430,398 B1 | 8/2002 | Blanc | |
| 7,110,786 B2 * | 9/2006 | Moulsley et al. | ............ 455/522 |
| 2002/0012383 A1 | 1/2002 | Higuchi et al. | |
| 2002/0021682 A1 | 2/2002 | Ariyoshi et al. | |
| 2002/0160799 A1 | 10/2002 | Kanemoto et al. | |

FOREIGN PATENT DOCUMENTS

| | | |
|---|---|---|
| JP | 06-021871 | 1/1994 |
| JP | 10-290195 | 10/1998 |
| JP | 2000-354004 | 12/2000 |
| JP | 2001-217773 | 8/2001 |
| JP | 2001-274748 | 10/2001 |
| JP | 2002-16545 | 1/2002 |
| JP | 2002-503427 | 1/2002 |
| JP | 2002-44017 | 2/2002 |
| JP | 2002-300107 | 10/2002 |

OTHER PUBLICATIONS

International Search Report dated Jul. 1, 2003.

* cited by examiner

*Primary Examiner*—Edward Urban
*Assistant Examiner*—Raymond S Dean
(74) *Attorney, Agent, or Firm*—Hanify & King, P.C.

(57) ABSTRACT

The present invention relates to a transmission power control apparatus and a radio base station that properly maintain a target value of uplink transmission quality as a reference for transmission power control. An object of the present invention is to accurately maintain a target value at a proper value at low cost. Thus, a transmission power control apparatus according to the present invention includes a monitor section which monitors a value of the uplink transmission quality; and a target value update section which updates the target value in such a manner as to decrease a difference between the value of the transmission quality monitored and the target value when the transmission quality is not in a predetermined range which includes the target value of the transmission quality as a reference.

12 Claims, 10 Drawing Sheets

PRIOR ART　　　　FIG. 10
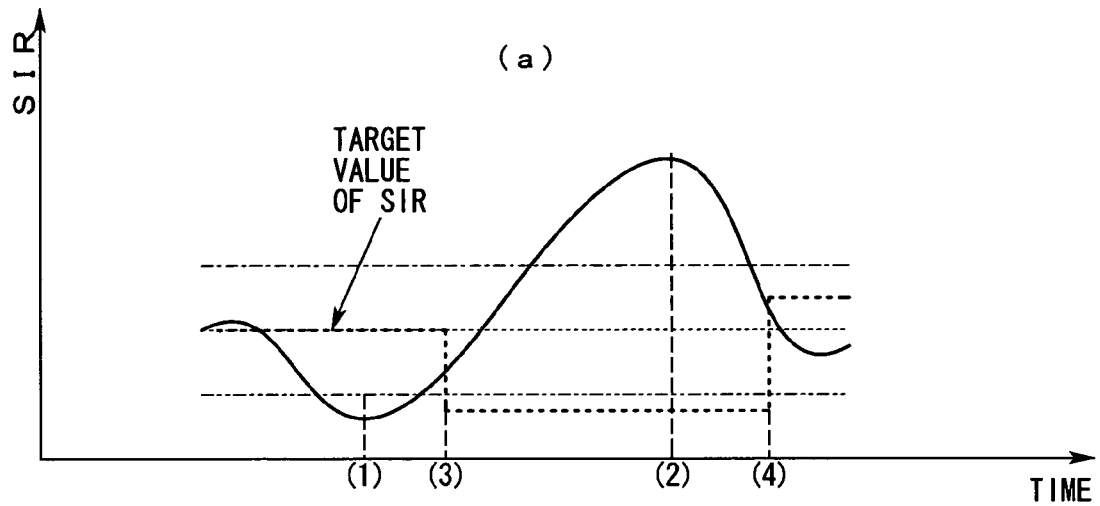
(a)
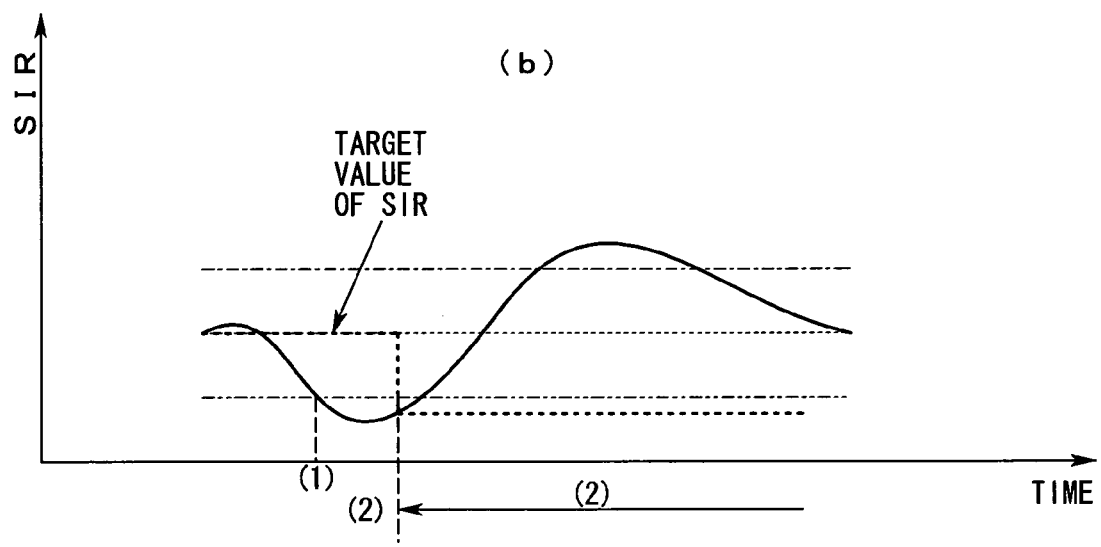
(b)
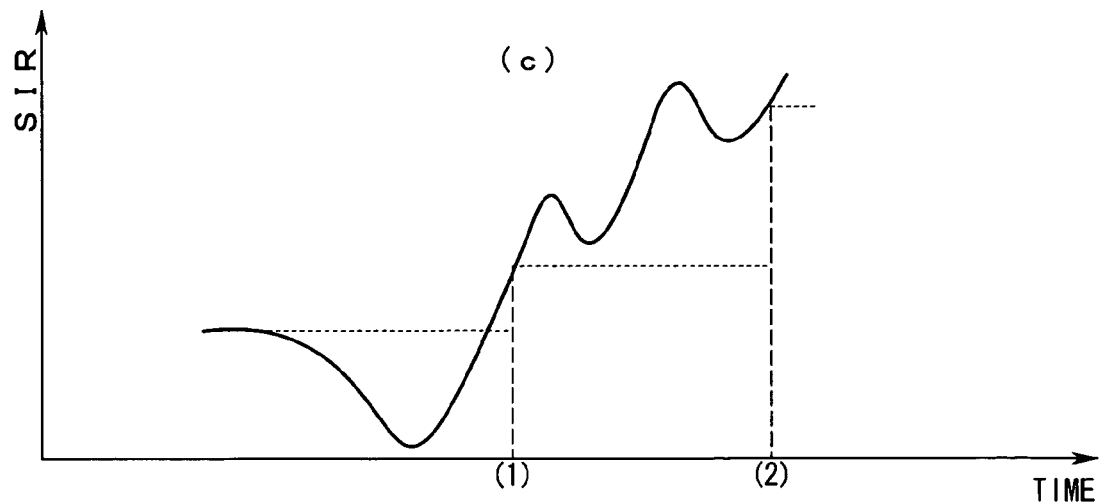
(c)

TRANSMISSION POWER CONTROL APPARATUS AND RADIO BASE STATION

CROSS-REFERENCE TO RELATED APPLICATION

This application is a continuation application of International Application PCT/JP03/03242, filed on Mar. 18, 2003, now pending and designating the U.S., the contents of which are herein wholly incorporated by reference.

BACKGROUND OF THE INVENTION

1. Field of the Invention

The present invention relates to a radio transmission system that controls transmission power so as to solve the far-near problem about transmission quality. In particular, the present invention relates to a transmission power control apparatus that properly maintains a target value of uplink transmission quality as a reference value for transmission power control, and to a radio base station having the transmission power control apparatus.

2. Description of the Related Art

The CDMA (Code Division Multiple Access) system features in secrecy and interference resistance. In addition, since a transmission power control technology that solves the far-near problem about transmission quality has been established, the CDMA system is being actively used in mobile communication systems and various radio transmission systems.

FIG. 9 is a schematic diagram showing an example of the structure of a radio transmission system that controls transmission power.

In the drawing, disposed in a radio zone 31 formed by a radio base station 30 are terminals 40-1 to 40-N. The radio base station 30 is connected to a base station control station 50 through a communication link 32.

The radio transmission system having this structure controls the transmission power in the following manner.

By referring to a target SIR value supplied by the base station control station 50 as will be described later, it performs the following processes.

The base station control station 50 monitors SIRs (Signal to Interference Ratios) of received waves that have arrived from the terminals 40-1 to 40-N through predetermined radio channels (for simplicity, assuming that they are radio channels that are allocated under a channel control or that are known under a zone structure and a frequency allocation) at predetermined intervals (for example, 800 times/second to 1500 times/second).

The base station control station 50 transmits to each of terminals as transmission ends of the received waves a transmission power command that contains binary information that means the transmission power of the received wave should be increased or decreased to a value of which the deviation of the SIR against the target SIR value is decreased.

Thus, the transmission quality of the radio transmission channels formed between the radio base station 30 and each of the terminals 40-1 to 40-N is properly maintained free of unnecessarily interference and disturbance against other radio channels formed in parallel in accordance with the CDMA system even if characteristics of the radio transmission channels such as movement of terminals, variations of ground shapes, and variations of buildings widely and sharply vary as long as the target SIR value is a properly value.

To accomplish the transmission power control performed at high speed, the radio base station 30 and the terminals 40-1 to 40-N associatively operate. These associations are simply referred to as inner loops.

The radio base station 30 and the base station control station 50 associatively operate in parallel with the inner loops.

The radio base station 30 successively transfers both messages individually received from the terminals 40-1 to 40-N and their transmission quality (for simplicity, it is assumed that the transmission quality is supplied as error information) to the base station control station 50 through a communication link 32.

The base station control station 50 monitors the transferred transmission quality at intervals of a predetermined period (for simplicity, it is assumed that the period is 4 seconds to 5 seconds) and properly updates the target SIR value with a value so that proper transmission quality is obtained.

The radio base station 30 applies the target SIR value to the inner loops.

Association of the radio base station 30 and the base station control station 50 is simply referred to as the outer loop.

In the foregoing related art reference, a trigger at which the target SIR value is updated is decided regardless of variations of characteristics of the radio transmission channels. Thus, in the related art reference, transmission power is not always properly controlled because of the following reasons.

The target SIR value that is updated is largely delayed (FIGS. 10(3) and (4)) after a trigger at which the transmission quality (error rate) is largely deteriorated (FIG. 10(1)) or improved (FIG. 10(2)). Thus, in any of the terminals 40-1 to 40-N, the transmission power is maintained at an excessively high value or the uplink transmission quality temporarily deteriorates.

Even if the deterioration (FIG. 10($b$)(1)) of the transmission quality (error rate) of a message is very low, the transmission power may be set to an excessively high value (FIG. 10($b$)(2)).

The transmission power that is updated is largely delayed after a trigger at which the SIR of the message deteriorated or improved (FIG. 10($c$)(1), (2)). Thus, transmission power cannot be controlled in real time. In addition, the target SIR value cannot be always properly set.

[Patent Document 1] Japanese Unexamined Patent Application Publication No. 2001-274748 (claim 1)

SUMMARY OF THE INVENTION

An object of the present invention is to provide a transmission power control apparatus that can accurately maintain a target SIR value for inner loop control at a proper value at low cost without necessity of changes of the structure and basic channel control process and to a radio base station that has the transmission power control apparatus.

Another object of the present invention is to allow a radio transmission system according to the present invention to be flexibly applicable to various zone structures and channel allocations, traffic to be decreased and congestion to be prevented in a radio transmission region, and limited radio frequencies to be effectively used and the number of terminals and traffic accommodated per unit frequency to be improved.

Another object of the present invention is to improve a transmission power control with respect to real time and accuracy in comparison with the related art reference.

Another object of the present invention is to prevent each terminal from being frequently caused to increase and decrease transmission power.

Another object of the present invention is to stably and accurately perform a transmission power control through an inner loop without necessity of a quick response in comparison with the case that at timing of which transmission quality of a signal that has arrived from a terminal has largely improved even in a short period the target value is updated.

Another object of the present invention is to improve responsiveness even if change rates of transmission quality of signals that have arrived from terminals concentrate at small values.

Another object of the present invention is to allow a target value to be properly maintained in real time as long as process amounts can be increased as the frequency at which a first determination is performed is increased.

The foregoing object is accomplished by a transmission power control apparatus and a radio base station having the transmission power control apparatus that determine whether or not monitored transmission quality is in a range of values including a target value of the transmission quality, and when the determined result has become false, update the target value with a value of which the difference between the transmission quality and the target value is lightened or compressed.

The transmission power control apparatus and the radio base station quickly update the target value with a value corresponding to transmission quality when it has deviated from the range of values even if the transmission quality of a radio frequency signal that has arrived has widely or sharply improved or deteriorated.

In addition, the foregoing object is accomplished by a transmission power control apparatus and a radio base station having the transmission power control apparatus that determine whether or not the absolute value of a change rate of monitored transmission quality is equal to or larger than a predetermined threshold value, and when the determined result has become false, update the target value with a value of which the difference between the transmission quality and the target value is lightened or compressed.

The transmission control apparatus and the radio base station quickly update the target value with a value corresponding to transmission when the determined result becomes false even if the transmission quality of a radio frequency signal that has arrived from a terminal has widely or sharply improved or deteriorated.

In addition, the foregoing object is accomplished by a transmission power control apparatus that maintains both or either of an upper limit value and a lower limit value of the range of values at a value suitable for the history of the transmission quality.

The transmission power control apparatus can flexibly and accurately maintain the target value at a value corresponding to improvement or deterioration of transmission quality of a received wave that has arrived from a terminal without a delay thereof.

In addition, the foregoing object is accomplished by a transmission power control apparatus that maintains the threshold value at a value suitable for the history of the transmission quality.

The transmission power control apparatus can flexibly and accurately maintain the target value at a value corresponding to improvement or deterioration of transmission quality of a received wave that has arrived from a terminal without a delay thereof.

In addition, the foregoing object is accomplished by a transmission power control apparatus that makes a first determination on whether or not transmission quality monitored in a first partial window is in a predetermined range of values, when the determined result is false, makes a second determination on whether or not transmission quality in a second partial window can be restored with predetermined accuracy, and when the result of the second determination has become false, updates the target value.

The transmission power control apparatus can maintain the target value even if transmission quality of a received wave that has arrived from a terminal linearly and sharply varies as long as it is highly predicted that the average value of transmission quality does not largely vary for the time being.

In addition, the foregoing object is accomplished by a transmission power control apparatus that makes a first determination on whether or not the absolute value of a change rate of transmission quality monitored in a first partial window is equal to or smaller than a predetermined threshold value, when the determined result is false, makes a second determination on whether or not transmission quality in a second partial window can be restored with predetermined accuracy, and when the result of the second determination has become false, updates the target value.

The transmission power control apparatus can maintain the target value even if transmission quality of a received wave that has arrived from a terminal linearly and sharply varies as long as it is highly predicted that the average value of transmission quality does not largely vary for the time being.

In addition, the foregoing object is accomplished by a transmission power control apparatus that stops counting a time window containing the first partial window after the first partial window has elapsed when the result of the first determination has not become false.

When the result of the first determination has not become false, the transmission power control apparatus prevents the second partial window preceded by the first partial window from unnecessarily elapsing, neither updating the target value, nor performing the first determination.

In addition, the foregoing object is accomplished by a transmission power control apparatus that stops counting the second partial window when the target value has been updated.

When the determined result of the second determination is false in the period of the second partial window and the target value is updated, the transmission power control apparatus does not unnecessarily continue the second partial window, but quickly sets the first partial window and starts the first determination.

In addition, the foregoing object is accomplished by a transmission power control apparatus that updates the target value to a value that is smaller as time for which the beginning of the first partial window shifts on the time axis is shorter, and sets the beginning of the successive first partial window after the beginning of a transmission unit successively received as the radio frequency signal from the terminal when the target value has been updated.

The transmission power control apparatus can frequently perform the first determination for each transmission unit. The transmission power control apparatus updates the target value according to the result of the first determination for each the transmission unit accurately corresponding to substantial transmission quality of a radio frequency signal that has arrived from the terminal.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 10 is a schematic diagram describing a problem of a related art reference.

DESCRIPTION OF THE PREFERRED EMBODIMENTS

First of all, principles of transmission power control apparatuses according to the present invention will be described.

Figure 1:
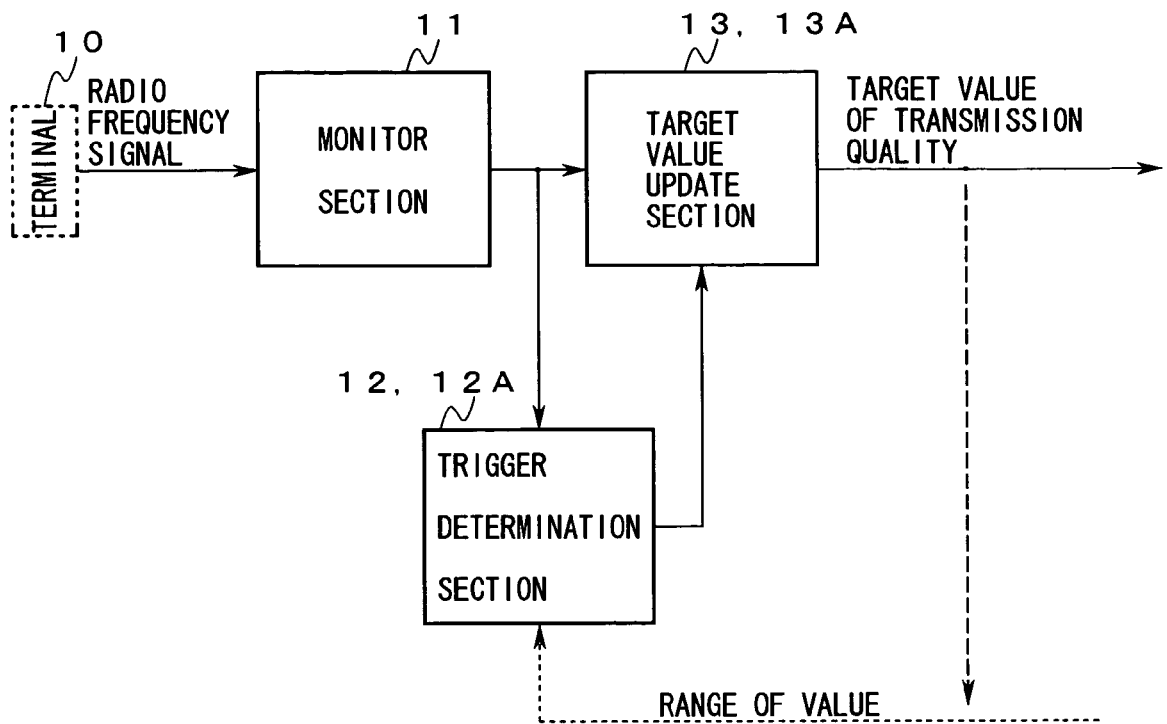
FIG. 1 is a block diagram showing a first principle of the present invention.

FIG. 1 is a block diagram showing a first principle of the present invention.

The transmission power control apparatus shown in FIG. 1 is composed of a monitor section 11, a trigger determination section 12, 12A, and a target value update section 13, 13A.

A first transmission power control apparatus according to the present invention and a radio base station that has the transmission power control apparatus operate in accordance with the following principle.

The monitor section 11 monitors a value of transmission quality (for example, error rate (BLER)) of a radio frequency signal that has arrived from a terminal 10. The trigger determination section 12 determines whether or not the value of the transmission quality monitored by the monitor section 11 is in a predetermined range of values based on a target value of the transmission quality to be maintained to control transmission power of the radio frequency signal. When the result determined by the trigger determination section 1 2 is false, the target value update section 13 updates a target value (SIR) for inner loop power control so that the difference between the value of the transmission quality monitored by the monitor section 11 and the target quality value. When the determined result is true, the target value update section 13 does not update the target value.

In other words, even if the transmission quality of the radio frequency signal that has arrived from the terminal 10 widely or sharply improves or deteriorates, when the transmission quality deviates from the range, the target value is quickly updated to a value corresponding to the transmission quality.

Thus, with respect to real time and accuracy, the transmission power control is more improved than the related art reference in which a trigger with which the target value is updated at predetermined long intervals regardless of the transmission quality of the radio frequency signal.

A second transmission power control apparatus according to the present invention and a radio base station having the transmission power control apparatus operate in accordance with the following principle.

The monitor section 11 monitors the value of transmission quality (error rate) of a radio frequency signal that has arrived from the terminal 10. The trigger determination section 12A determines whether or not the change rate of the value of the transmission quality monitored by the monitor section 11 is within a predetermined threshold value.

When the determined result is false, the target value update section 13A updates the target value (SIR) so that the difference between the value of the transmission quality (error rate) monitored by the monitor section 11 and the target value of the transmission quality (error rate) to be maintained to control in the transmission power for the radio frequency signal is decreased.

In other words, even if the transmission quality of the radio frequency signal that has arrived from the terminal 10 widely or sharply improves or deteriorates, when the determined result becomes false, the target value (SIR) is quickly updated to a value corresponding to the transmission quality.

Thus, with respect to real time and accuracy, the transmission power control is more improved than the related art reference in which a trigger with which the target value is updated at predetermined long intervals regardless of the transmission quality of the radio frequency signal.

A third transmission power control apparatus according to the present invention operates in accordance with the following principle.

The trigger determination section 12 maintains both or either of an upper limit value and a lower limit value of the range at a value suitable for the history of transmission quality monitored by the monitor section 11 before the target value is updated.

In other words, the target value is flexibly and accurately maintained at a value corresponding to improvement or deterioration of the transmission quality of the received wave that has arrived from the terminal 10 without a delay.

Thus, the terminal is prevented from being caused to increase or decrease transmission power when the target value does not sufficiently correspond to the transmission quality.

A fourth transmission power control apparatus according to the present invention operates in accordance with the following principle.

The trigger determination section 12A maintains the threshold value at a value suitable for the history of the transmission quality monitored by the monitor section 11 before the target value is updated.

In other words, the target value is flexibly and accurately maintained at a value corresponding to improvement or deterioration of the transmission quality of the received wave that has arrived from the terminal 10 without a delay.

Thus, the terminal is prevented from being caused to increase or decrease transmission power when the target value does not sufficiently correspond to the transmission quality.

Figure 2:
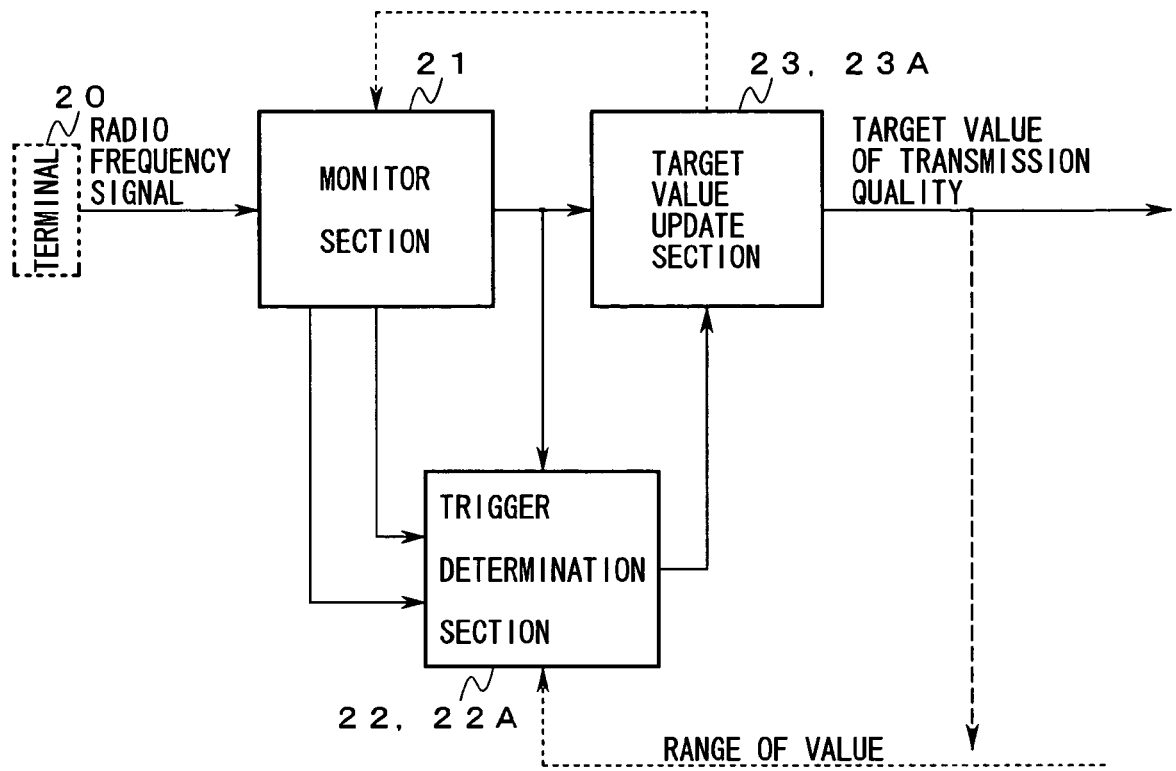
FIG. 2 is a block diagram showing a second principle of the present invention.

FIG. 2 is a block diagram showing a second principle of the present invention.

A transmission power control apparatus shown in FIG. 2 is composed of a monitor section 21, a trigger determination section 22, 22A, and a target value (error rate) update section 23, 23A.

A fifth transmission power control apparatus according to the present invention operates in accordance with the following principle.

The monitor section 21 monitors values of transmission quality (error rate) of radio frequency signals that have arrived in time sequence from a terminal 20 in each of a first partial window and a second partial window that is chronologically preceded by the first partial window. As a first determination, the trigger determination section 22 determines whether or not the value of the transmission quality monitored by the monitor section 21 in the first partial window is within a predetermined range of values.

When the determined result is false, as a second determination, the trigger determination section 22 determines whether or not the transmission quality in the second partial window can be restored to transmission quality at the beginning of the first partial window in the transmission quality monitored by the monitor section 21 with predetermined accuracy. When the result of the second determination has become false, the target value (SIR) update section 23 updates the target value (SIR) so that the difference between the value of the transmission quality (error rate) monitored by the monitor section 21 and the target value (error rate) of the transmission quality to control the transmission power for the radio frequency signal is decreased.

In other words, the target value (SIR) is maintained even if transmission quality (error rate) of a received wave that has arrived from the terminal 20 linearly and sharply varies as long as it is highly predicted that the average value of transmission quality (error rate) does not largely vary for the time being.

The transmission power control can be stably and accurately performed through an inner loop without necessity of a quick response in comparison with the case that at timing of which transmission quality has largely improved even in a short period the target value is updated.

A sixth transmission power control apparatus according to the present invention operates in accordance with the following principle.

The monitor section 21 monitors values of transmission quality (error rate) of radio frequency signals that have arrived in time sequence from a terminal 20 in each of a first partial window and a second partial window that is chronologically preceded by the first partial window. As a first determination, the trigger determination section 22A determines whether or not the absolute value of a change rate of the value of the transmission quality monitored by the monitor section 21 in the first partial window is equal to or smaller than a predetermined threshold value. When the determined result is false, as a second determination, the trigger determination section 22 determines whether or not the transmission quality in the second partial window can be restored to transmission quality at the beginning of the first partial window in the transmission quality monitored by the monitor section 21 with predetermined accuracy. When the result of the second determination has become false, the target value (SIR) update section 23A updates the target value (SIR) so that the difference between the value of the transmission quality (error rate) monitored by the monitor section 21 and the target value of the transmission quality (error rate) to control the transmission power for the radio frequency signal is decreased.

In other words, the target value (SIR) is maintained even if transmission quality of a received wave that has arrived from the terminal 20 linearly and sharply varies as long as it is highly predicted that the average value of transmission quality does not largely vary for the time being.

The transmission power control can be stably and accurately performed through an inner loop without necessity of a quick response in comparison with the case that at timing of which transmission quality has largely improved even in a short period the target value is updated.

A seventh transmission power control apparatus according to the present invention operates in accordance with the following principle.

After the first partial window has elapsed, when the result of the first determination has not become false, the monitor section 21 stops counting a time window containing the first partial window.

When the result of the first determination has not become false, the second partial window preceded by the first partial window can be prevented from unnecessarily elapsing, without updating the target value and performing the first determination.

Thus, even if change rates of transmission quality of signals that have arrived from terminals concentrate at small values, since the first partial windows and the second partial windows are alternately set in time sequence, responsiveness deteriorates. However, with this transmission power control apparatus, the responsiveness can be prevented from deteriorating.

An eighth transmission power control apparatus according to the present invention operates in accordance with the following principle.

When the target value update section 23, 23A has updated the target value, the monitor section 21 stops counting the second partial window.

In other words, when the result of the second determination has become false in the period of the second partial window and the target value has been updated, the second partial window is not unnecessarily continued. Instead, the first partial window is quickly set and the first determination is started.

Thus, even if change rates of transmission quality of signals that have arrived from terminals concentrate at small values, since the first partial windows and the second partial windows are alternately set in time sequence, responsiveness deteriorates. However, the responsiveness can be prevented from deteriorating.

A ninth transmission power control apparatus according to the present invention operates in accordance with the following principle.

As the shift time of the beginning of the first partial window on the time axis is shorter, the target value update section 23, 23A updates the target value with a smaller value. When the target value update section 23, 23A has updated the target value, the monitor section 21 sets the beginning of the first partial window after the beginning of a transmission unit that is received as a radio frequency signal from the terminal 20.

In other words, the first determination is highly frequently performed in each transmission unit. The target value as the result of the first determination is successively updated for each unit accurately corresponding to the substantial transmission quality of a radio frequency signal that has arrived from the terminal 20.

Thus, the target value can be properly maintained in real time as long as the first determination is frequently performed and the increase of the process amount necessary for the first determination does not exceed a predetermined limit.

Next, with reference to the accompanying drawings, embodiments of the present invention will be described in detail.

First Embodiment

Figure 3:
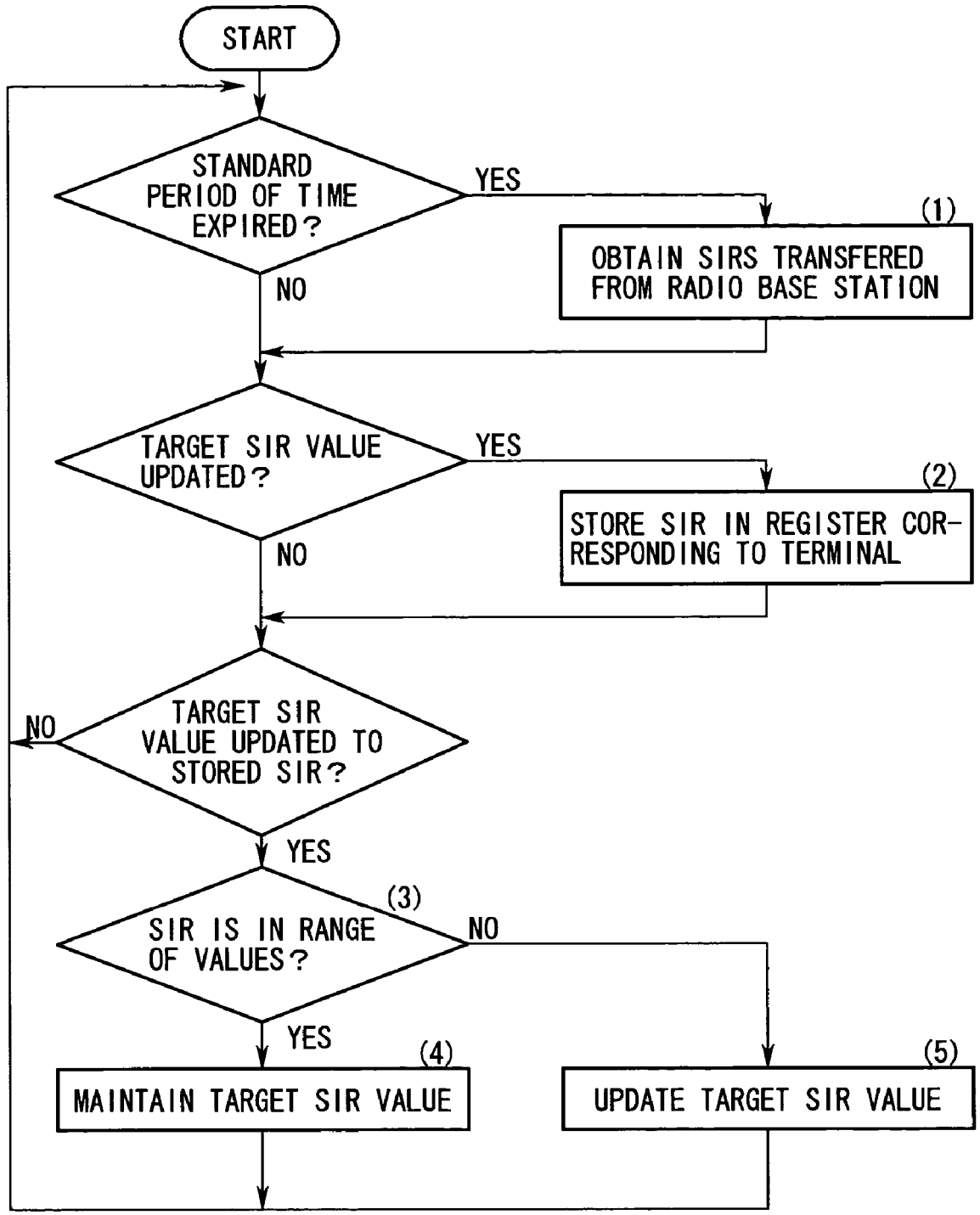
FIG. 3 is a flow chart showing an operation of a first embodiment of the present invention.

FIG. 3 is a flow chart showing the operation of a first embodiment of the present invention.

Figure 4:
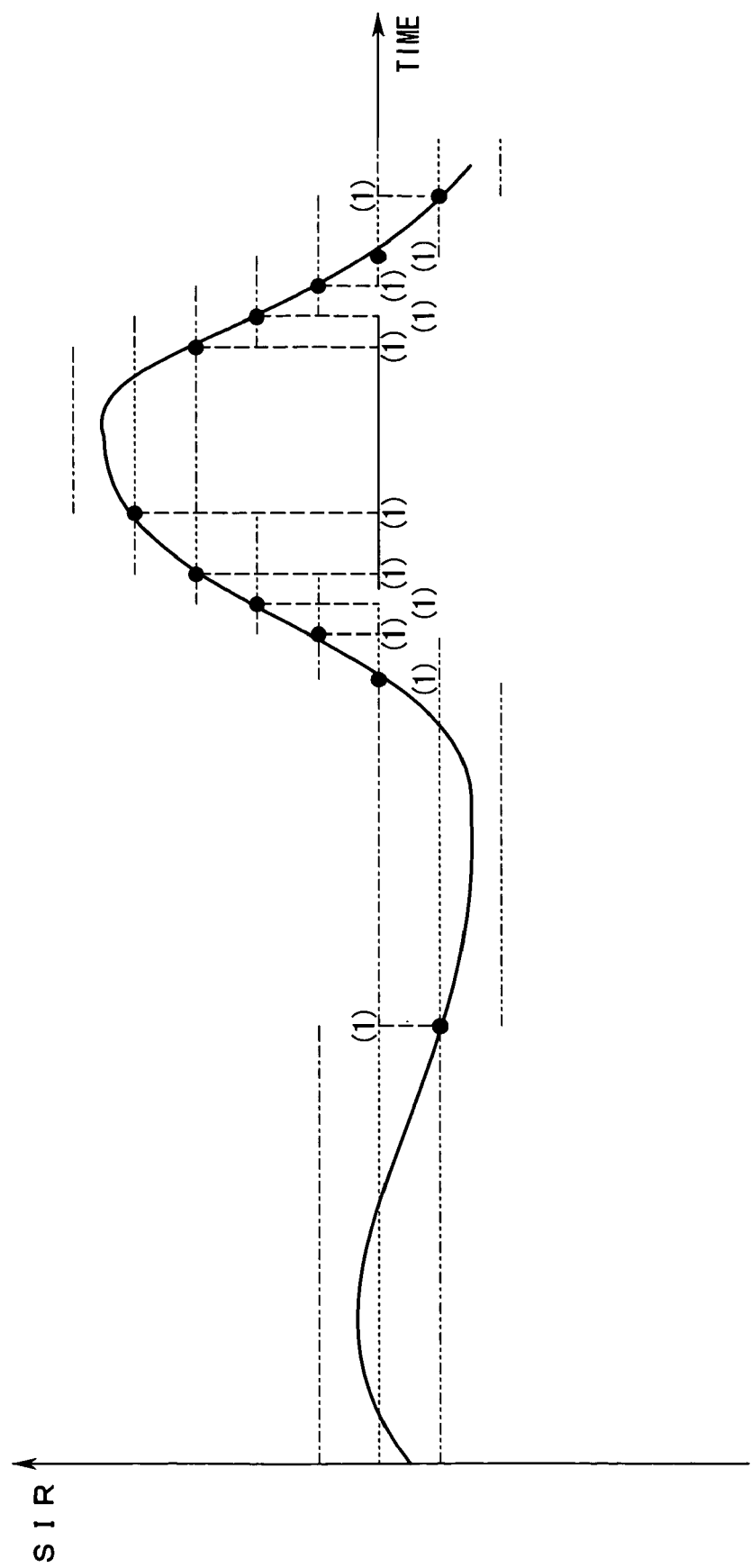
FIG. 4 is a schematic diagram describing the operation of the first embodiment of the present invention.

FIG. 4 is a schematic diagram describing the operation of the first embodiment of the present invention.

Figure 9:
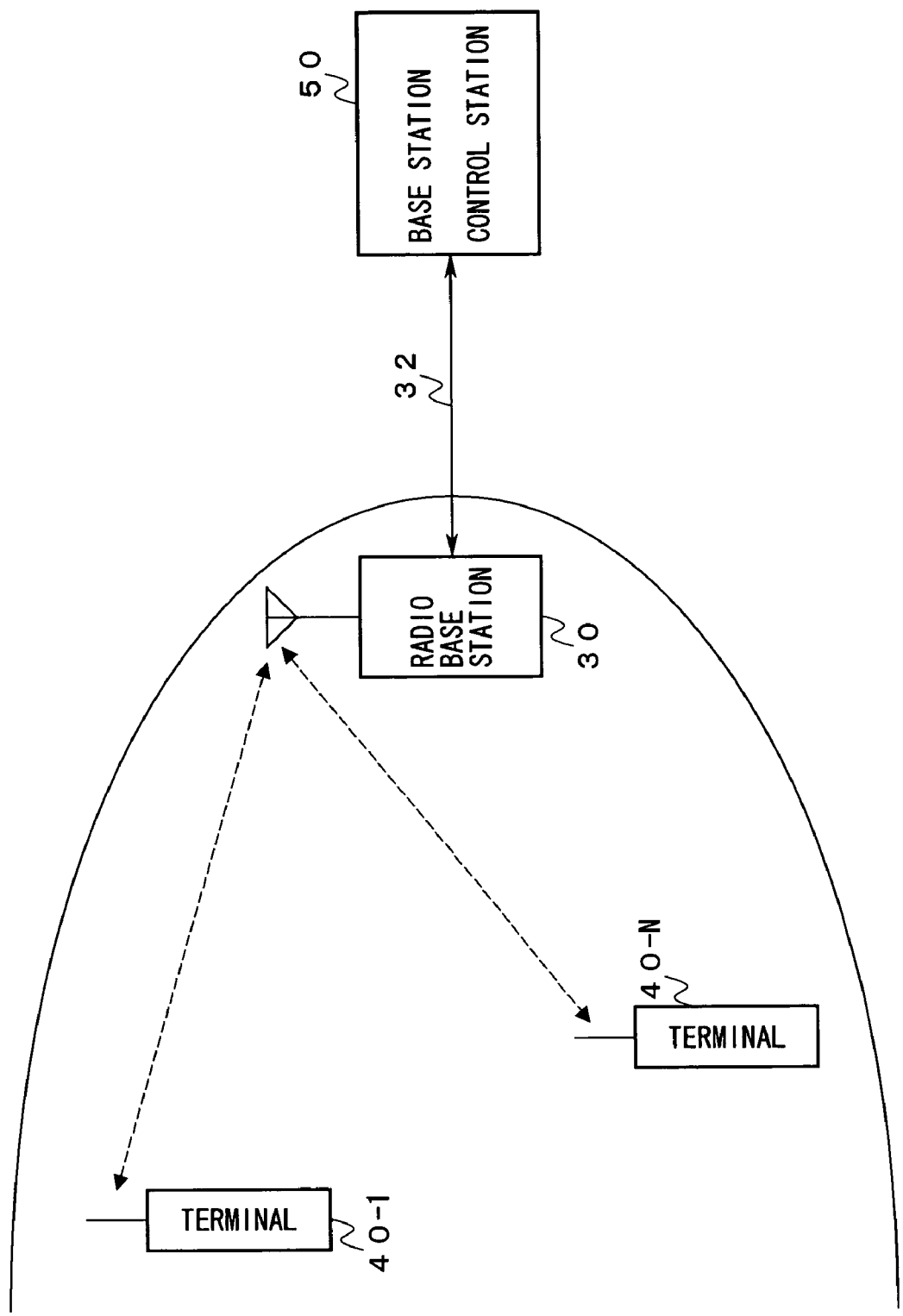
FIG. 9 is a schematic diagram showing an example of the structure of a radio transmission system that controls transmission power.

Next, with reference to FIG. 9, FIG. 3, and FIG. 4, the operation of the first embodiment of the present invention will be described.

This embodiment features the following processes that the base station control station 50 performs to update the target SIR value.

Note that in this embodiment the SIR is used as the transmission quality transmitted to the base station controller. Not to mention that the error rate such as BLER can be used as the transmission quality instead of the SIR transmitted. This holds in all of the embodiments.

Like the related art reference, the radio base station 30 successively transfers messages and their SIRs received from the terminals 40-1 to 40-N to the base station control station 50 through the communication link 32.

The base station control station 50 obtains these SIRs at intervals of a much shorter period (referred to as standard period) than the period (around 4 to 5 seconds) of the related art reference (FIG. 3(1)) and performs the following processes for each of the SIRs.

Whenever the target SIR value has been updated, the base station control station 50 stores it in predetermined registers corresponding to terminals (FIG. 3(2)).

Whenever the latest SIR has been obtained in the predetermined period, the base station control station 50 determines whether the latest SIR is in a predetermined range of values (it is assumed that a lower limit value and an upper limit value that are lower and larger than the target SIR value by δ (>0), respectively) (hereinafter this process is referred to as the first determination) (FIG. 3(3)).

When the result of the first determination is true, the base station control station 50 maintains the value of the target SIR value (FIG. 3(4)).

In contrast, when the result of the first determination is false, the base station control station 50 updates the target SIR value with a value corresponding to the latest SIR or a value of which the deviation of the latest SIR against the target SIR value is corrected (FIG. 3(5) and FIG. 4(1)).

Like the related art reference, the radio base station 30 maintains the inner loop in accordance with the target SIR value.

In other words, even if the SIR widely or sharply increases or decreases, the target SIR value with which transmission power is controlled through the inner loop is flexibly maintained at a value corresponding to the SIR in the standard period.

Thus, with respect to real time and accuracy, the transmission power control is more improved than the related art reference in which a trigger with which the target SIR value is updated at predetermined long intervals regardless of the observed SIR is decided.

In addition, according to this embodiment, since the target SIR value is accurately maintained with a proper value, power control command can be prevented from being transmitted to the terminal. In addition, traffic can be decreased and congestion can be prevented in a radio transmission section. Moreover, limited radio frequencies can be effectively used and the number of terminals and traffic accommodated per unit frequency can be improved.

Second Embodiment

Figure 5:
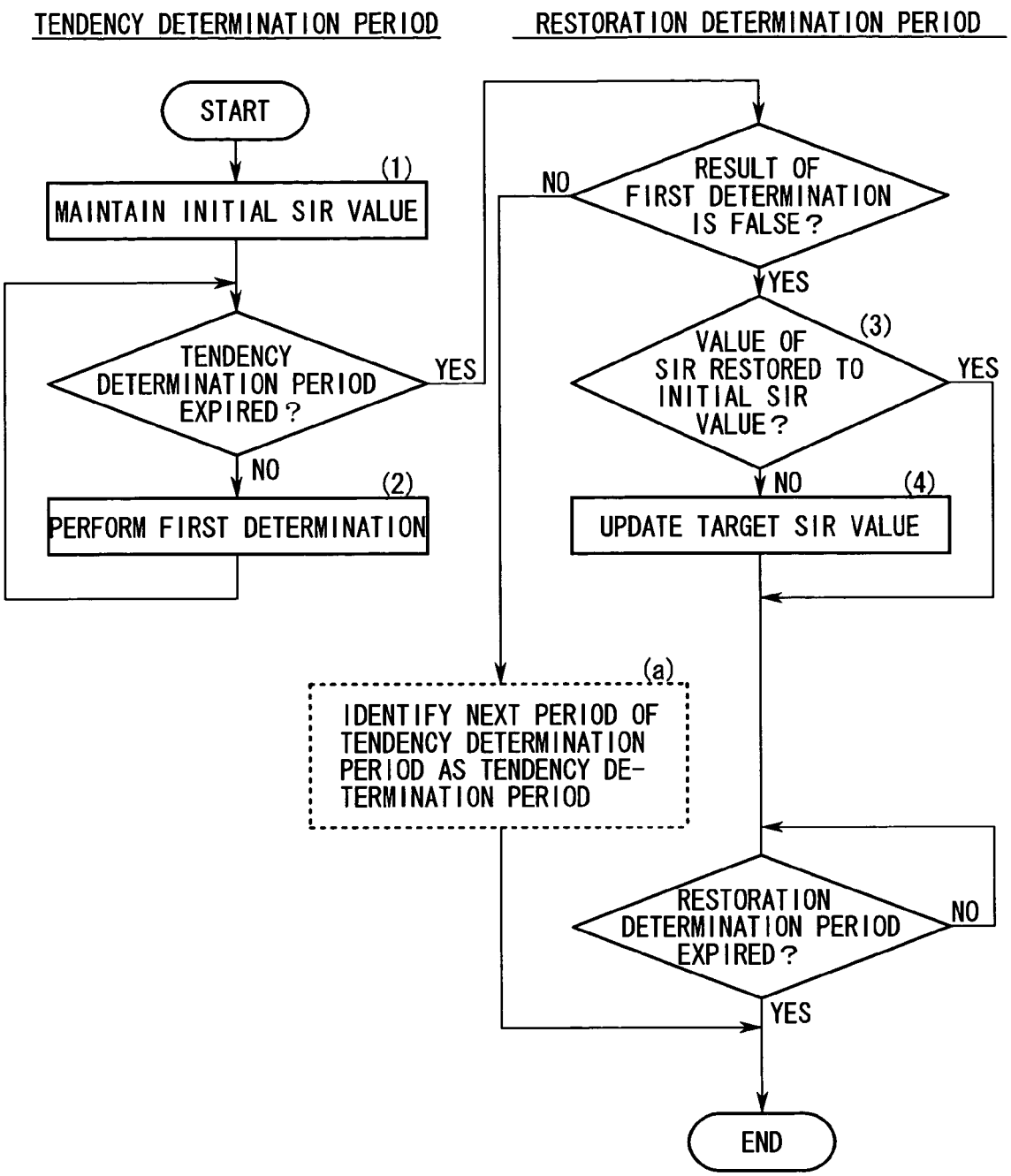
FIG. 5 is a flow chart showing an operation of second and third embodiments of the present invention.

FIG. 5 is a flow chart showing the operations of second and third embodiments of the present invention.

Figure 6:
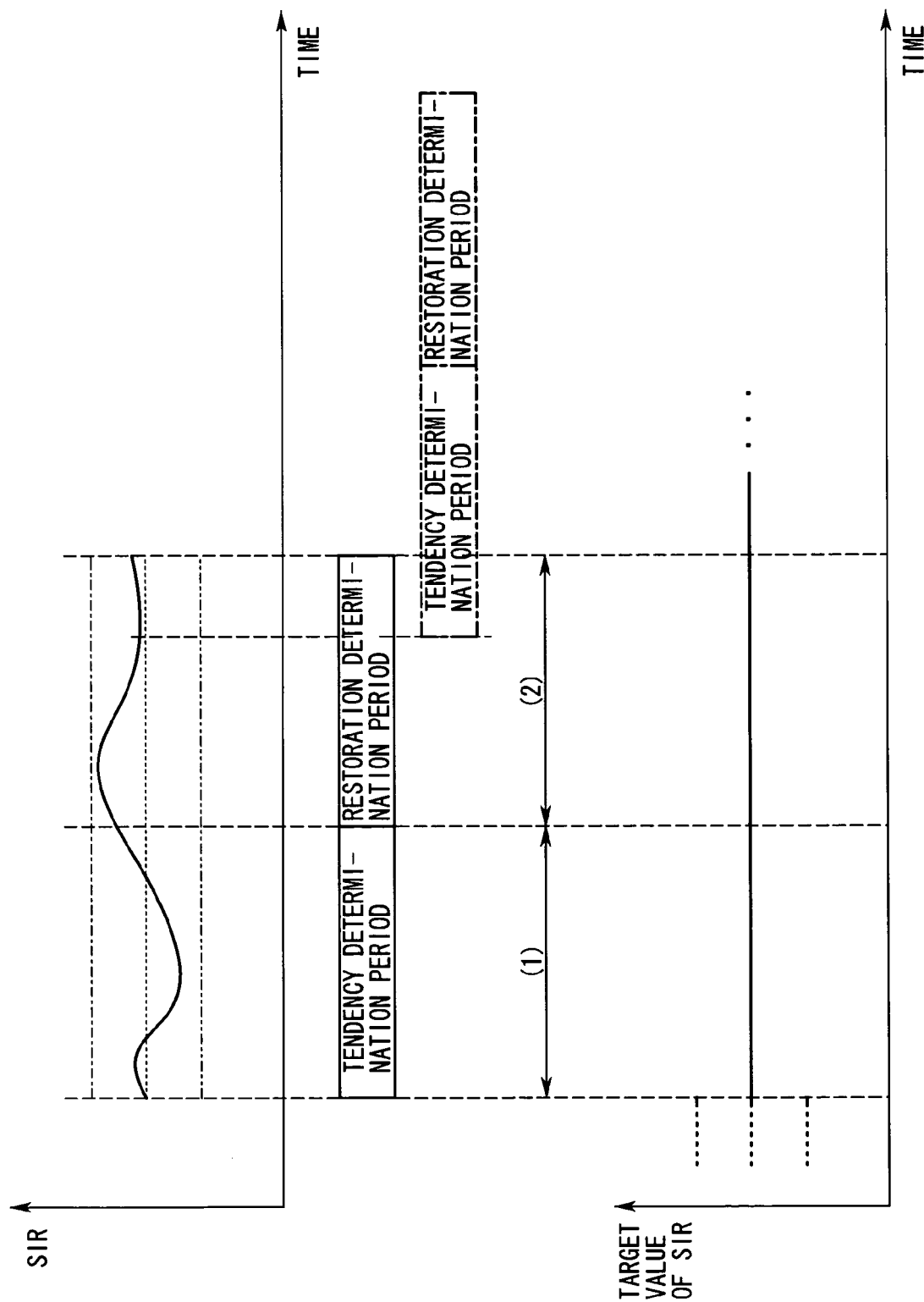
FIG. 6 is a schematic diagram (1) showing the operation of the second embodiment of the present invention.

FIG. 6 is a schematic diagram (1) showing the operation of the second embodiment of the present invention.

Figure 7:
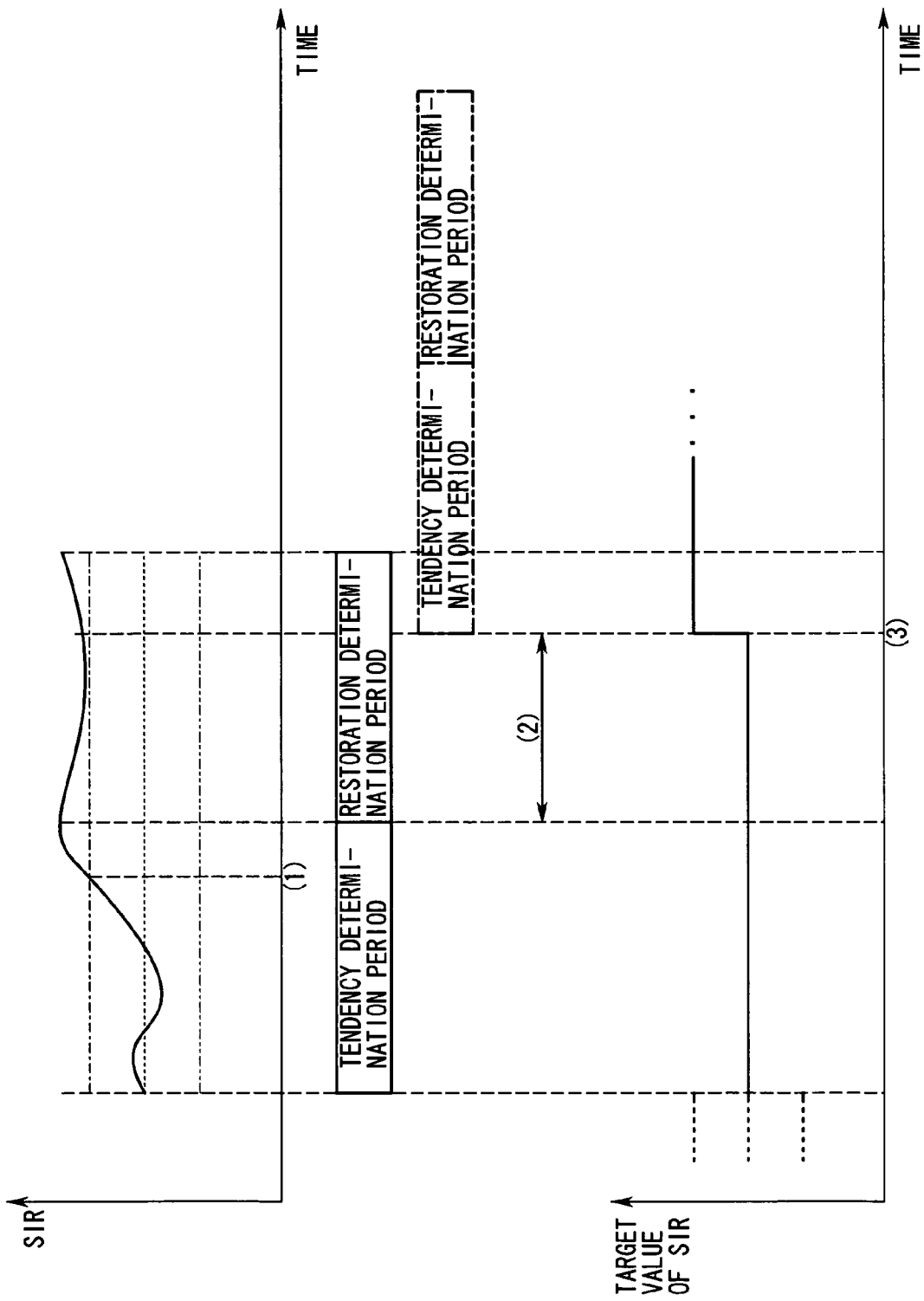
FIG. 7 is a schematic diagram (2) showing the operation of the second embodiment of the present invention.

FIG. 7 is a schematic diagram (2) showing the operation of the second embodiment of the present invention.

Next, with reference to FIG. 9 and FIG. 5 to FIG. 7, the operation of the second embodiment will be described.

This embodiment features the following processes that the base station control station 50 performs in a tendency determination period and a restoration determination period into which the basic period is divided, the tendency determination period and the restoration determination period being adjacent on the time axis.

The base station control station 50 maintains the value of an SIR at the beginning of the tendency determination period (hereinafter referred to as the initial SIR value) (FIG. 5(1)) and performs the first determination in only the tendency determination period like the first embodiment (FIG. 5(2)).

After the tendency determination period has elapsed (FIG. 6(1)), when the result of the first determination has not become false, the base station control station 50 maintains the target SIR value, not update it, in the subsequent restoration determination period (FIG. 6(2)).

However, if the result of the first determination has become false in the tendency determination period (FIG. 7(1)) at least one time, the base station control station 50 performs the following processes in the subsequent restoration determination period.

The base station control station 50 predicts whether or not the value of the SIR is restored to the initial SIR value in the restoration determination period (FIG. 5(3)).

As long as the predicted result is true, the base station control station 50 does not update the target SIR value (FIG. 7(2)).

However, when the predicted result is false, the base station control station 50 updates the target SIR value with the same value as that described in the first embodiment (FIG. 5(4) and FIG. 7(3)).

Even if the SIR linearly and sharply varies, as long as it is highly predicted that the average value of the SIR does not to largely vary for the time being with high probability, the base station control station 50 does not update the reference SIR.

Thus, transmission power is more stably and accurately controlled through an inner loop without unnecessarily higher responsiveness than the first embodiment of which the target SIR value is updated even if the SIR abruptly and largely increases in a short period.

Third Embodiment

Figure 8:
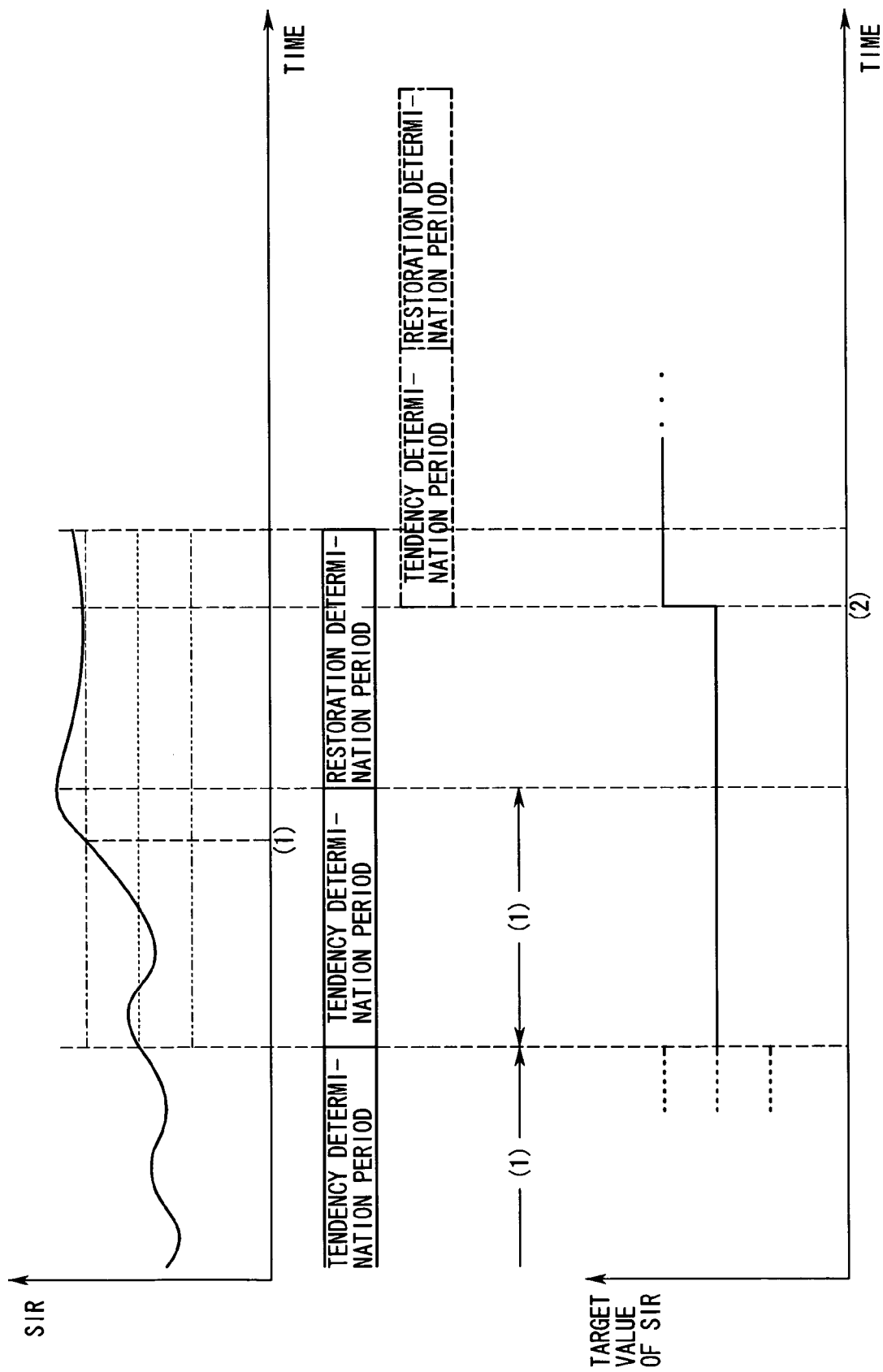
FIG. 8 is a schematic diagram showing the operation of the third embodiment of the present invention.

FIG. 8 is a schematic diagram describing a third embodiment of the present invention.

Next, with reference to FIG. 9 and FIG. 5 to FIG. 8, the operation of the third embodiment of the present invention will be described.

This embodiment features the following processes that the base station control station 50 performs.

After any tendency determination period has elapsed, when the result of the first determination has not become false, the base station control station 50 identifies the next period of the tendency determination period as the tendency determination period rather than the restoration determination period (FIG. 5(a) and FIG. 8(1)). In addition, the base station control station 50 performs the same processes as those of the second embodiment.

In other words, when the result of the first determination has not become false in the tendency determination period, the base station control station 50 prevents the period preceded by the tendency determination period from unnecessarily elapsing as the restoration determination period, neither updating the target value, nor performing the first determination.

In addition, when the base station control station 50 has updated the target SIR value in the restoration determination period by the same process as the second embodiment, the base station control station 50 stops counting the restoration determination period and identifies the current time as the beginning of the subsequent tendency determination period to start the process (FIG. 8(2)).

Thus, even if the absolute values of change rates of SIRs concentrate at small values, since the tendency determination period and the restoration determination period are alternately set in time sequence, responsiveness (the frequency at which the first determination is performed) deteriorates. However, according to this embodiment, the responsiveness can be prevented from deteriorating.

In addition, according to this embodiment, the tendency determination period in which the first determination is performed is flexibly and properly maintained as a period in which the SIR varies. Thus, according to this embodiment, the responsiveness can be highly maintained.

Fourth Embodiment

Next, with reference to FIG. 9 and FIG. 5 to FIG. 8, the operation of a fourth embodiment of the present invention will be described.

This embodiment features the following processes that the base station control station 50 performs.

With respect to the beginning of the tendency determination period, the base station control station 50 identifies the end of the preceding restoration determination period or tendency determination period or time t at which one of the following times t1 to t3 has elapsed after the base station control station 50 has stopped counting the preceding restoration determination period as the beginning of the subsequent tendency determination period and performs the first determination in the same manner as the second or third embodiment.

time t1 equal to the product of a symbol period of a received wave that has arrived from a relevant terminal through a predetermined radio channel and a predetermined integer, time t2 equal to the product of duration T1 of tendency determination period or the sum of duration T1 of tendency determination period and duration T2 of restoration determination period and a predetermined constant, time t3 given as an approximate value of one of times t1 and t2 and securely synchronized with each symbol of a received wave.

The base station control station 50 maintains the absolute value $\delta$ (>0) of the difference between the difference of the upper limit value and the lower limit value of the range of values and the target SIR value as a preceded result at a value $\delta'$ expressed by the following formula.

$$\delta' = \delta \cdot T/(\alpha \cdot T1 + \beta \cdot T2)$$

where $\alpha$ and $\beta$ (=1−$\alpha$) are ratios that secure tendency determination period and restoration determination period, respectively.

In other words, the first determination is performed more frequently than that in the second and third embodiments. The target SIR value as the result of the first determination is updated for each divided value that accurately corresponds to substantial variation of the SIR.

Thus, the target SIR value can be accurately maintained with a proper value in real time as long as the first determination is frequently performed and the increase of the process amounts necessary for the first determination does not exceed a predetermined limit.

In the foregoing embodiments, the target SIR value is updated with a value corresponding to the latest SIR at which the result of the first determination has become true.

However, the present invention is not limited to such a structure. For example, the average value of a plurality of SIRs that have observed before the time may be calculated (by the exponential smoothening method of which the sum of products of SIRs and weights that increase in time sequence, the moving average convergence divergence trading method of which an average value is obtained at intervals of a predetermined period, or any other algorithm). The target SIR value may be updated with the latest average value. Thus, an error of the target SIR value caused by quick response against sharp increase or decrease because of the target SIR value updated with the latest average value may be lightened.

Alternatively, the average value may be replaced with a predicted value obtained by any predicting process. When a channel control process or a call setup process (including a routing process) is performed, the target SIR value may be updated with the predicted value. Alternatively, when the target SIR value is replaced with any value obtained by an algorithm corresponding to the distribution of traffic or another event, the target SIR value may be flexibly updated with the obtained value corresponding to the structure and status of the system.

In the foregoing embodiments, it is thought that time at which it has been determined that the latest SIR observed at intervals of a standard period that is much shorter than that of the related art reference is not included in the range of values is a trigger for which the target SIR value is updated.

However, this trigger may be time at which the absolute value of the change rate of the observed SIR exceeds a predetermined upper limit value.

In the foregoing embodiments, transmission quality that is updated through an outer loop and supplied to an inner loop is provided as a target SIR value.

However, such transmission quality may be evaluated as a result of a CRC check performed by the radio base station 30 against a received wave that has arrived from a terminal or as a BER (Bit Error Rate) detected in a turbo decoding process for the received wave as long as the transmission quality can be compared wit the target SIR value or the range of values can be securely defined.

Moreover, in the foregoing embodiments, the present invention is applied to the base station control station 50, which operates in association with the radio base station 30, which forms the radio zone 31, through the communication link 32.

However, the present invention is not limited to the base station control station 50. For example, the present invention may be applied to a radio base station that is annexed to the base station control station 50 and a plurality of radio base stations to which load and functions are distributed and that are disposed under the control of the base station control station 50.

In the foregoing embodiments, what the target SIR value is updated is not limited to the foregoing value. For example, the foregoing value may be set as a really measured value or a theoretical value obtained by a field test, a circuit design, or the like as long as the value can be set in a sufficiently wide range and updated.

Moreover, in the foregoing embodiments, it is assumed that the processes are executed by a processor disposed in the base station control station 50 and the remaining throughput of the processor is used.

However, all or part of these processes may be performed by dedicated hardware.

In addition, the invention is not limited to the above embodiments and various modifications may be made without departing from the spirit and scope of the invention. Any improvement may be made in part or all of the components.

What is claimed is:

1. A transmission power control apparatus, comprising:
  a monitor section which monitors values of transmission quality of radio frequency signals in each of time windows composed of a first partial window and a second partial window that chronologically succeeds the first partial window, the radio frequency signals arriving from a terminal in time sequence;
  a trigger determination section which makes a first determination on whether or not a value of the transmission quality monitored by said monitor section in the first partial window is in a predetermined range of values and makes a second determination on whether or not transmission quality in said second partial window can be restored with a predetermined accuracy to transmission quality at a starting point of the first partial window when a result of the first determination is false; and
  a target value update section which updates a target value for inner loop power control in such a manner as to decrease a difference between a value of the transmission quality monitored by said monitor section and the target value of the transmission quality of the radio frequency signal under transmission power control when a result of the second determination is false.

2. A transmission power control apparatus, comprising:
  a monitor section which monitors values of transmission quality of radio frequency signals in each of time windows composed of a first partial window and a second partial window that chronologically succeeds the first partial window, the radio frequency signals arriving from a terminal in time sequence;
  a trigger determination section which makes a first determination on whether or not an absolute value of a change rate of a value of the transmission quality monitored by said monitor section in the first partial window is in a predetermined range of values and makes a second determination on whether or not transmission quality in said second partial window can be restored with a predetermined accuracy to transmission quality at a starting point of the first partial window when a result of the first determination is false; and
  a target value update section which updates a target value for inner loop power control in such a manner as to decrease a difference between a value of the transmission quality monitored by said monitor section and the target value of the transmission quality of the radio frequency signal under transmission power control when a result of the second determination is false.

3. The transmission power control apparatus as set forth in claim 1, wherein
  said monitor section stops counting time in a time window containing the first partial window after the first partial window has elapsed with no false result of the first determination.

4. The transmission power control apparatus as set forth in claim 2, wherein
  said monitor section stops counting time in a time window containing the first partial window after the first partial window has elapsed with no false result of the first determination.

5. The transmission power control apparatus as set forth in claim 1, wherein
  said monitor section stops counting time in the second partial window when said target value update section has updated the target value.

6. The transmission power control apparatus as set forth in claim 2, wherein
  said monitor section stops counting time in the second partial window when said target value update section has updated the target value.

7. The transmission power control apparatus as set forth in claim 1, wherein:
  said target value update section updates the target value to a value that decreases as a time for which a starting point of a successive first partial window shifts on the time axis decreases; and
  said monitor section sets the starting point of the successive first partial window to a point after a starting point of a transmission unit received from said terminal as said radio frequency signal when said target value update section has updated the target value.

8. The transmission power control apparatus as set forth in claim 2, wherein
  said target value update section updates the target value to a value that decreases as a time for which a starting point of a successive first partial window shifts on the time axis decreases; and
  said monitor section sets the starting point of the successive first partial window to a point after a starting point of a transmission unit received from said terminal as said radio frequency signal when said target value update section has updated the target value.

9. The transmission power control apparatus as set forth in claim 3, wherein
  said target value update section updates the target value to a value that decreases as a time for which a starting point of a successive first partial window shifts on the time axis decreases; and
  said monitor section sets the starting point of the successive first partial window to a point after a starting point of a transmission unit received from said terminal as said radio frequency signal when said target value update section has updated the target value.

10. The transmission power control apparatus as set forth in claim 4, wherein
  said target value update section updates the target value to a value that decreases as a time for which a starting point of a successive first partial window shifts on the time axis decreases; and said monitor section sets the starting point of the successive first partial window to a point after a starting point of a transmission unit received from said terminal as said radio frequency signal when said target value update section has updated the target value.

11. A radio base station having said transmission power control apparatus as set forth in claim 1.

12. A radio base station having said transmission power control apparatus as set forth in claim 2.

* * * * *